United States Patent [19]

Hashimoto et al.

[11] Patent Number: 5,706,757
[45] Date of Patent: Jan. 13, 1998

[54] INDICATING INSTRUMENT

[75] Inventors: Hiroshi Hashimoto; Masami Kataoka, both of Anjyo, Japan

[73] Assignee: Nippondenso Co., Ltd., Kariya, Japan

[21] Appl. No.: 392,853

[22] PCT Filed: Aug. 3, 1994

[86] PCT No.: PCT/JP94/01238

§ 371 Date: Mar. 2, 1995

§ 102(e) Date: Mar. 2, 1995

[87] PCT Pub. No.: WO95/04918

PCT Pub. Date: Feb. 16, 1995

[30] Foreign Application Priority Data

Aug. 6, 1993 [JP] Japan ................. 5-196014

[51] Int. Cl.$^6$ ................. G01D 13/22; G01R 1/08
[52] U.S. Cl. ................. 116/288; 116/DIG. 6
[58] Field of Search ................. 116/286, 287, 116/288, 328, 332, DIG. 6, DIG. 36; 362/26, 29; 368/228, 234, 238

[56] References Cited

U.S. PATENT DOCUMENTS

| 2,536,557 | 1/1951 | Levesque | 116/286 X |
|---|---|---|---|
| 3,033,155 | 5/1962 | Beckman | 116/288 |
| 3,129,691 | 4/1964 | Walker | 116/288 X |
| 5,152,456 | 10/1992 | Murphy | |
| 5,259,333 | 11/1993 | Iino et al. | 116/286 |
| 5,546,888 | 8/1996 | Skiver et al. | 116/286 |

FOREIGN PATENT DOCUMENTS

| 351 259 | 1/1990 | European Pat. Off. | |
|---|---|---|---|
| 503 400 | 9/1992 | European Pat. Off. | |
| 961694 | 5/1950 | France | 116/286 |
| 41 29 057 | 3/1993 | Germany | |
| 54-44545 | 3/1979 | Japan | |
| 62-9124 | 1/1987 | Japan | |
| 2298818 | 12/1990 | Japan | |
| 499028 | 8/1992 | Japan | |

*Primary Examiner*—William A. Cuchlinski, Jr.
*Assistant Examiner*—Willie Morris Worth
*Attorney, Agent, or Firm*—Cushman, Darby & Cushman IP Group of Pillsbruy Madison & Sutro LLP

[57] ABSTRACT

The present invention is to provide an indicating instrument useful to a speedometer for a vehicle. An internal driving unit (2) is secured to a printed circuit board (1), and a cylindrical rotating shaft (6) is carried by bearings (4, 5) of the internal driving unit (2). A pointer (9) is secured to the rotating shaft (6) and rotated via the rotating shaft (6) by the internal driving unit (2). A light emitting diode (12) is disposed inside the rotating shaft (6) and secured to the printed circuit board (1). Light emitted by the light emitting diode is collected by a light collecting portion (9a) of the pointer (9), reflected by a reflecting portion (9b) and illuminates the pointer (9).

6 Claims, 6 Drawing Sheets

FIG. 6

INDICATING INSTRUMENT

TECHNICAL FIELD

The present invention relates to an indicating instrument in which a pointer rotated by a internal driving unit indicates a value to be read, and especially to an indicating instrument having a pointer illuminated by a light emitted from an outside light source.

BACKGROUND ART

Conventional indicating instruments for vehicles such as speedometers which have illuminated pointers are shown in Japanese Utility Model Application Laid Open No. Hei 3-36920 and Japanese Utility Model Application Laid Open No. Sho 54-44545.

The first, a conventional indicating instrument disclosed in Japanese Utility Model Application No. Hei 3-36920, has a pointer which includes therein a light source rotated by a rotating shaft. The second, a conventional indicating instrument disclosed in Japanese Utility Model Application Sho 54-44545, has a light source disposed outside a pointer and an offset shaft formed to surround the light source and rotate the pointer.

In the first conventional instrument, since electric power must be supplied from a stationary portion to the light source which rotates together with the pointer, the structure becomes complicated, thereby causing an increase in the axial size of the instrument.

In the second conventional instrument, a special shaft such as an offset shaft must be employed and, moreover, the efficiency of the light transmission from the light source to the pointer is low since the light leaks outside the pointer.

The present invention is made in view of the above, and has an object of providing an indicating instrument in which a light source may be secured to a stationary base member to illuminate the pointer, where the instrument is simple in structure, axially compact, free from the need of a special shaft such as an offset shaft, and which achieves high efficiency in light transmission from the light source to the pointer.

DISCLOSURE OF THE INVENTION

An indicating instrument according to the present invention includes an internal driving unit having a bearing secured to a base member, a rotating shaft carried by the bearing and rotated by the internal driving unit and a pointer having high light conductance characteristics and held rotably along with the rotating shaft, and is characterized in that an accommodation space formed at the center of the shaft inside either one of or both the bearing and the rotating shaft to face the aforementioned base member, and a light source is disposed in the accommodation space and secured to the base member. Since the light source is secured to the stationary base member, power is supplied through the base member without difficulty so that a simple, axially compact indicating instrument which is free from the need to use a special shaft like an offset shaft may be provided. Further, since the light source is disposed in an accommodation space which is formed inside either one of or both the bearing and the rotating shaft, the light source is enclosed by either or both the bearing and the rotating shaft so that the light coming from the light source may be transmitted to the pointer without leaking out, and the efficiency of the instrument's light transmission is enhanced.

An indicating instrument according to the present invention is further characterized in that a light collecting portion having a light collecting surface which faces the light source and reflecting surface and which couples with the light collecting surface is formed at the foot portion of the pointer approximately perpendicular thereto, and the collecting surface is formed in a curved shape to condense the light onto the reflecting surface. As a result, since the curved light collecting surface of the pointer condenses the light coming from the light source onto the reflecting member, the light leaking out from the reflecting surface may be almost eliminated and the transmission efficiency of the light may thereby be enhanced.

An indicating instrument according to the present invention is characterized in that the rotating shaft is formed into a cylindrical shape, and a light collecting portion having a light collecting surface which faces the light source and a reflecting surface which couples with the collecting surface is formed at the foot portion of the pointer approximately perpendicular thereto, where the outside diameter of the aforementioned light collecting portion is formed to be approximately equal to the inside diameter of the rotating shaft to be press-fitted into the rotating shaft. As a result, since the light collecting portion is press-fitted into the rotating shaft, all the light may come into the light collecting surface and the light transmission efficiency of the device is further raised.

An indicating instrument according to the present invention is still further characterized in that the projecting bottom portion of the light collecting portion abuts one end of the rotating shaft. As a result, a precise right angle between the light collecting portion and the rotating shaft is assured without increasing the portion of the light collecting portion interfering with the rotating shaft.

An indicating instrument according to the present invention is characterized in that the outside diameter of at least a part of the light source is formed to be approximately equal to the inside diameter of one of the bearings and is positioned thereby. As a result, the bearing is used as a guide to position the light source so that any interference of the light from the light source with the rotating shaft may be eliminated and adjustment of the light axis of the light source to the light collecting surface of the pointer may be made without extra work.

An indicating instrument according to the present invention is characterized in that the light source emits a plurality of colors and a switch is used to change the display color. As a result, the illumination color of the pointer may be changed according to the reading of the pointer.

An indicating instrument according to the present invention is still further characterized in that the switch means changes the display light color when the reading is under or over a given value. As a result, the pointer indicates zones divided by a given threshold value. In case of a speedometer, for example, when the threshold value is given as 100 Km/h, the pointer indicates a speed warning.

An indicating instrument according to the present invention is characterized to include a stepping motor having bearings secured to the base member, a cylindrical rotating shaft carried on the bearings to be rotated by the stepping motor, a light conductive pointer disposed to rotate along with the rotating shaft and a light source disposed inside the rotating shaft and secured to the base member to illuminate the pointer. As a result, a sufficient torque may be obtained to rotate the shaft and the pointer.

BEST MODE OF CARRYING OUT THE INVENTION

The present invention will be described in detail with reference to the appended drawings.

Figure 1:
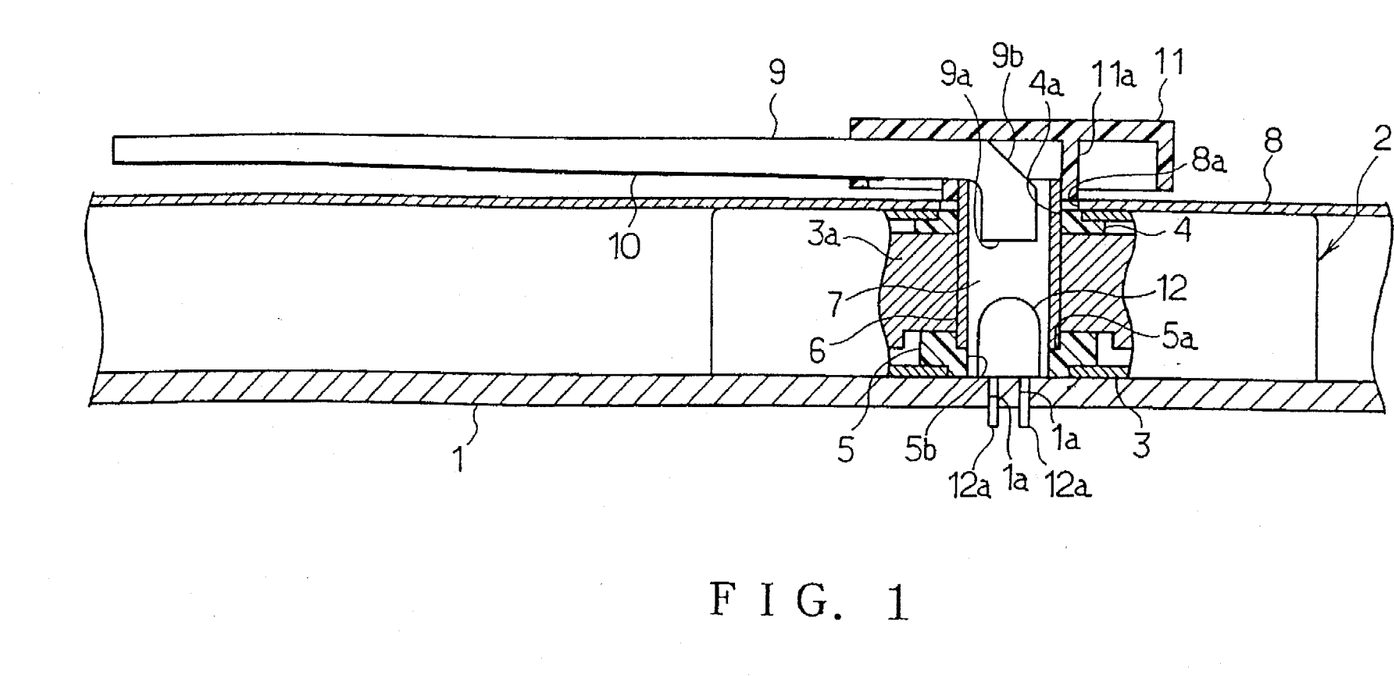
FIG. 1 is a longitudinal cross-section of a first embodiment according to the present invention.

FIG. 1 is a longitudinal cross-section illustrating a first embodiment of the present invention which is applied to a speedometer for a vehicle.

A base member such as a printed circuit board 1 is housed in a main case (not shown) and an internal driving unit 2 is disposed thereon (front surface). Flat synthetic-resinous cylindrical bearings 4 and 5 extending inward are respectively disposed at upper and lower portions of a case 3. A cylindrical rotating shaft 6 which provides an accommodation space 7 at the center inside the shaft is rotatably carried on the bearings 4 and 5. A lower end of the rotating shaft 6 is supported by a step portion 5a of the bearing 5, and its upper end extends upward through an opening 4a of the bearing 4. The inner accommodation space 7 opens to an upper portion of the printed circuit board 1 through the opening 5b of the bearing 5.

The internal driving unit 2 includes the bearings 4 and 5 disposed in the case 3 and a stepping motor having a magnet 3a and other members for a rotor integrally secured to the rotating shaft 6, and turns a pointer a by an angle corresponding to the level of the speed signal.

A dial plate 8 covers an upper surface of the main case (not shown), and has an opening 8a to pass therethrough an upper end portion of the rotating shaft 6 and a graded scale (not shown) printed on the dial plate 8.

The pointer 9 is made of a light conductive material such as acrylic resin and is shaped into a long beam. The foot portion of the pointer 9 is formed into a L-shape which has one end forming a light collecting surface 9a and a slant corner formed opposite the light collecting surface 9a, thereby forming a light reflecting surface 9b. A colored layer 10 is formed on the back of the pointer 9 except the foot portion, on which a cover 11 made of synthetic resin is mounted to cover the foot portion as a member of the pointer 9. The cover 11 has a cylindrical connecting member 11a press-fitted onto the upper end of the rotating shaft 6.

A light emitting diode 12 used as a light source is disposed in the accommodation space 7 inside the rotating shaft 6. Pin terminals 12a are inserted into respective through holes 1a and secured to the printed circuit board 1. Thus, the upper side of the light emitting diode 12 faces the light collecting surface 9a.

The light emitting diode 12 is energized through the pin terminals 12a which are soldered to a conductive pattern (not shown) formed on the back of the printed circuit board 1.

The operation of the embodiment is explained next.

When a speed signal is given to the internal driving unit 2, the rotating shaft 6 turns by an angle corresponding to the vehicle speed, and the pointer 9 turns together with the rotating shaft 6 to indicate the speed. When the light emitting diode is energized and emits light, the light is received by the light collecting surface 9a of the pointer 9, reflected at the light reflecting surface 9b and guided along the beam to the pointed head. The light is then diffused on the way by the colored layer 10 and illuminates the pointer with red color.

In the present embodiment, the rotating shaft 6 is formed into a cylindrical shape to provide the accommodation space 7 therein and the light emitting diode 12 is disposed in the accommodation space 7 and secured to the printed circuit board 1. Therefore, since the light emitting diode 12 is powered through the conductive pattern of the stationary printed circuit board 1, any special structure for use as a power supply as in the first conventional instrument is not necessary, thus resulting in a simple and axially compact structure. Further, since the rotating shaft 6 is formed into a cylindrical shape to provide the accommodation space 7 therein, any special shaft like an offset shaft as used in the second conventional instrument is not necessary. Still further, since the light emitting diode 12 is enclosed by the rotating shaft 6, the light emitted from the light emitting diode 12 does not leak out and is transmitted to the light collecting surface 9a of the pointer, so that the light transmission efficiency of the device is improved, thereby illuminating the pointer more efficiently. Since the stepping motor is employed as part of the internal driving unit 2 to turn the rotating shaft 6, more torque may be obtained than the conventional cross-over coil type unit.

Figure 2:
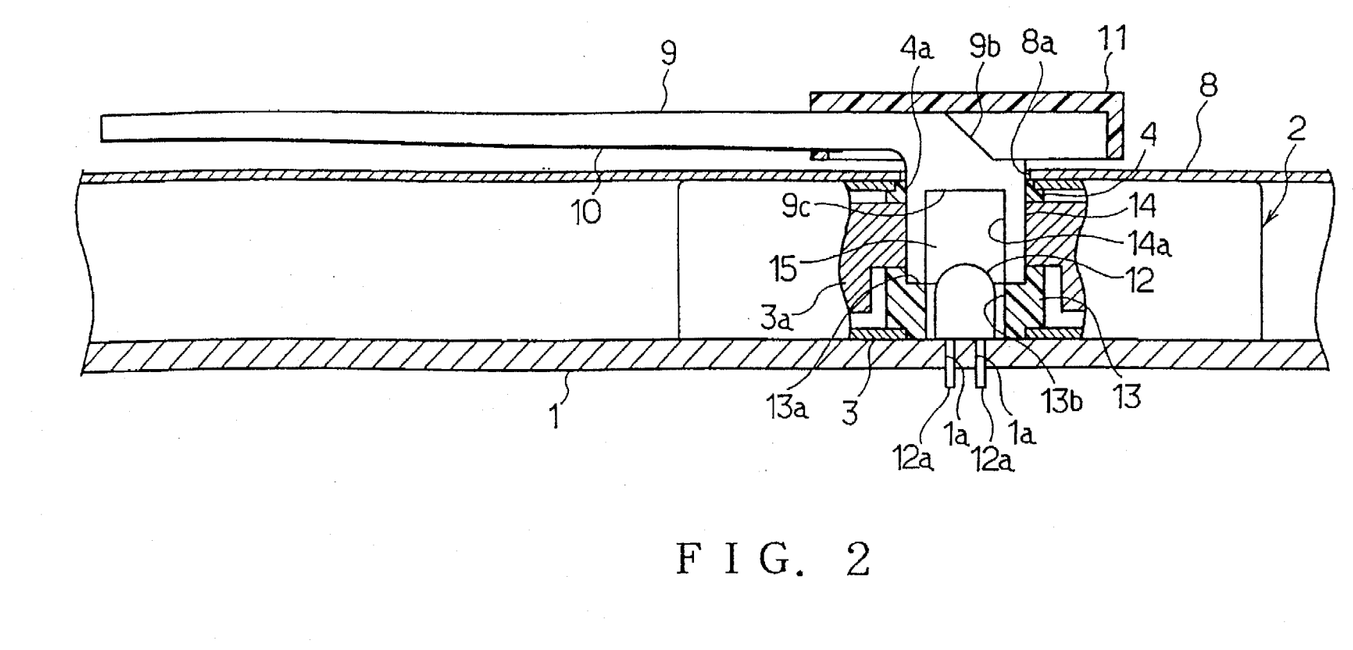
FIG. 2 is a longitudinal cross-section of a second embodiment according to the present invention.

FIG. 2 illustrates a second embodiment, in which the same reference numerals are put on portions similar to corresponding positions in the first embodiment, and an explanation will be made with regard to different portions.

A synthetic resinous bearing 13 which has a step portion 13a and an opening 13b is disposed at the lower portion of the case 3 of the internal driving unit 2. The bearing 13 protrudes upward further than the bearing 5 of the first embodiment. A rotating shaft 14 extending downward is integrally formed at the foot portion of the pointer 9. The upper portion of the rotating shaft 14 is carried by the bearing 4, and the lower portion thereof is supported by a step portion 13a of the bearing 13.

The rotating shaft 14 has therein a circular recess 14a opening downward and forms together with the opening 13a of the bearing 13 an accommodation space 15 open to the printed circuit board 1 at the center of the rotating shaft 14. Thus, the top portion of the recess 14a of the rotating shaft 14 forms the light collecting surface 9c of the pointer 9.

The light emitting diode 12 is disposed in the accommodation space 15 formed by the bearing 13 and the rotating shaft 14, and is secured to the printed circuit board 1 in the same manner as the first embodiment.

Accordingly, the second embodiment also attains the same result as the first embodiment and has a reduced parts count in comparison with the first embodiment.

Figure 3:
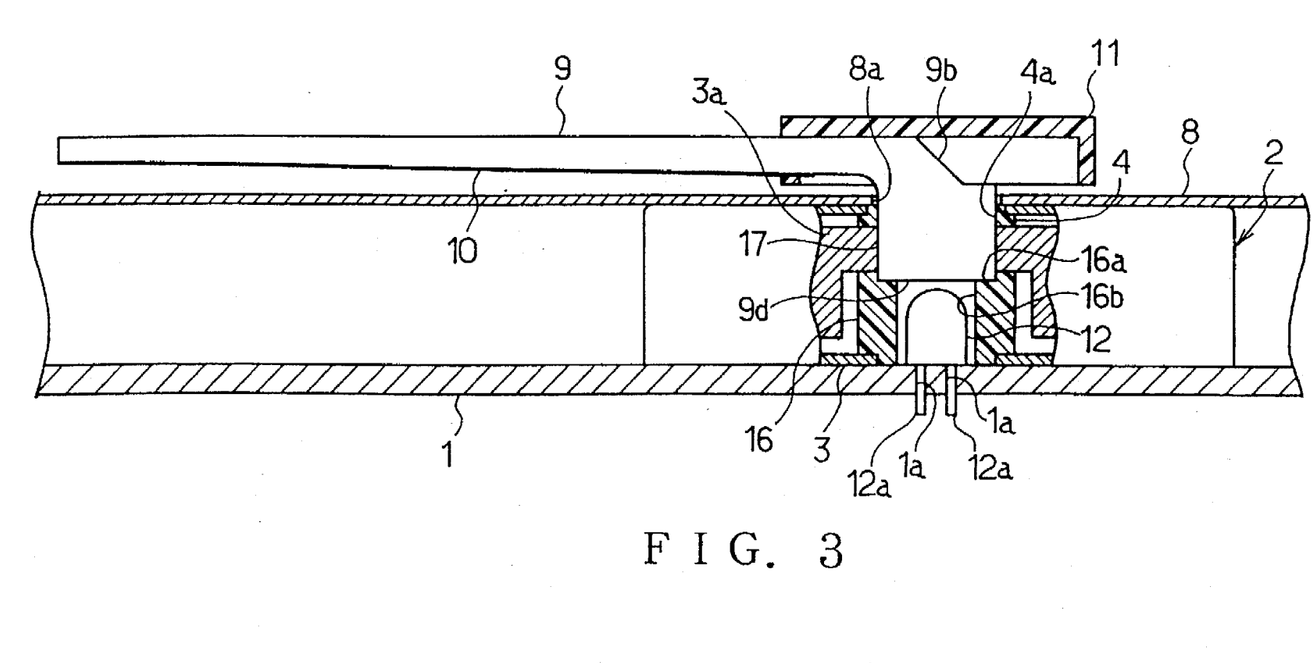
FIG. 3 is a longitudinal cross-section of a third embodiment according to the present invention.

FIG. 3 illustrates a third embodiment, in which the same reference numerals are put on portions similar to corresponding portions in FIG. 2, and an explanation will be made with regard to different portions.

A synthetic resinous bearing 16 having a step portion 16a and an opening 16b which forms the accommodation space is disposed at the lower portion of the case 3 of the internal driving unit 2. The bearing 16 protrudes upward much further than the bearing 13 shown in FIG. 2. A solid rotating shaft 17 extending downward is integrally formed at the foot portion of the pointer 9, carried by the bearing 4 at its upper portion and supported by the step portion 16a of the bearing 16 at its bottom portion.

The light emitting diode 12 is located in the accommodation space formed inside the opening 16 and secured to the printed circuit board 1 in the same manner as the first embodiment.

Thus, the third embodiment also attains the same effect as the second embodiment.

Figure 4:
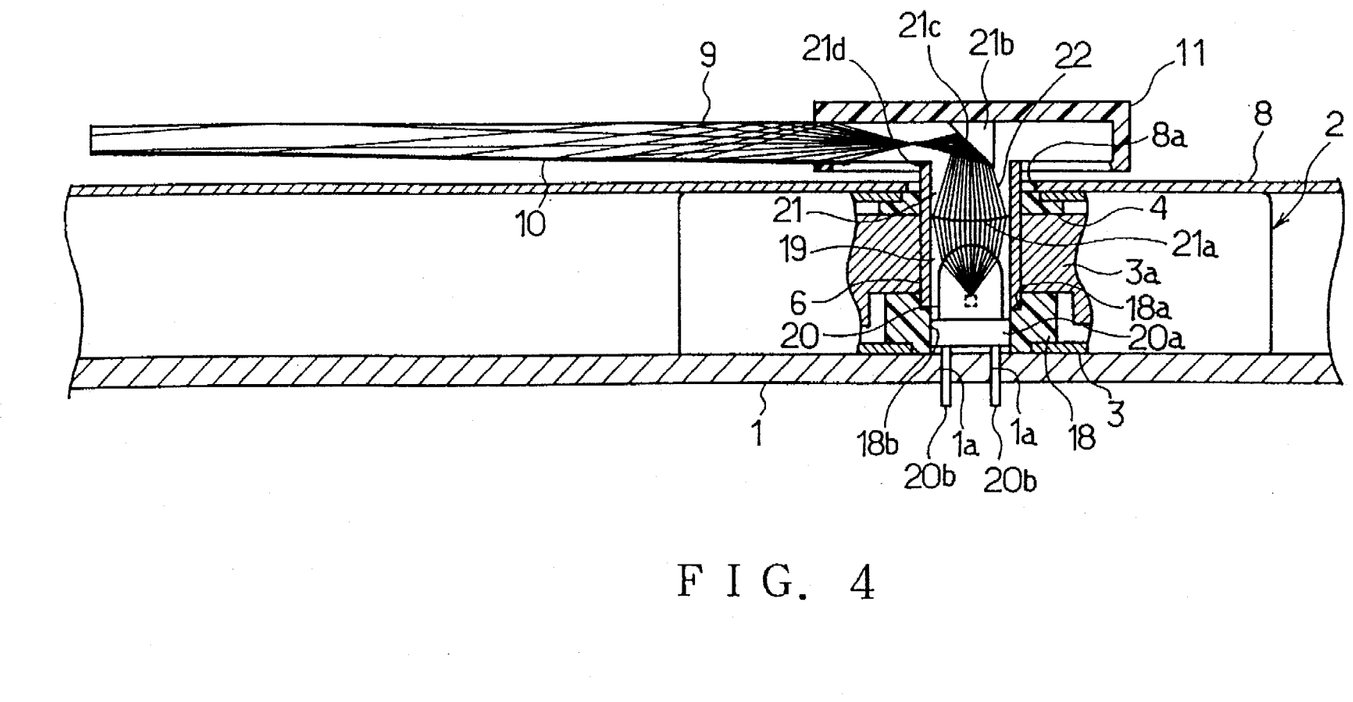
FIG. 4 is a longitudinal cross-section of a fourth embodiment according to the present invention.

FIG. 4 illustrates a fourth embodiment, in which the same reference numerals are put on portions similar to corresponding portions shown in FIG. 1, and an explanation will be made with regard to different portions.

A synthetic resinous bearing 18 having a step portion 18a and an opening 18b is disposed at the lower portion of the case 3 of the internal driving unit 2. The bearing 18 extends upward further than the bearing 5 shown in FIG. 1 and supports the lower end portion of the rotating shaft 6 at its step portion 18a. The inner surface of the rotating shaft 6 and the lower portion of the opening 18b of the bearing 18 jointly form the accommodation space 19 which is located at the center of the rotating shaft 6 and opens to the printed circuit board 1.

A light emitting diode 20 used as the light source has a base member 20a with its outside diameter greater than the rest and pin terminals 20b and 20b extending from the base member 20a. The outer diameter of the base member 20a of the light emitting diode 20 is formed to be approximately equal to the inside diameter of the bearing 18 or that of the opening 18b so that the base member 20a is fitted into the opening 18b of the bearing 18 in the accommodation space 19 with the pin terminals 20b and 20b being inserted in the through holes 1a.

A flat columnar light collecting portion 21 is integrally formed at the foot portion of the pointer 9 perpendicularly thereto and formed at its lower end surface with a light collecting surface 21a which is convex toward the bottom. A V-shaped cut portion 21b is formed as an inclined reflecting surface 21c at a portion to which the light collecting surface 21a of the light collecting portion 21 couples optically. The outside of the light collecting portion 21a of the pointer 21 is arranged to have approximately the same diameter as the inside of the rotating shaft 6, and the light collecting portion 21 of the pointer 9 is press-fitted into the rotating shaft 6 so that the pointer rotates along with the rotating shaft 6. In this case, the step portion 21d of the light collecting portion 21 abuts the upper end of the rotating shaft 6. When the light emitting diode 20 is energized and emits light 22, the light 22 is received by the light collecting surface 21a of the light collecting portion 21 of the pointer 9, collected or condensed on the reflecting surface 21c, reflected by the reflecting surface 21c, guided along the pointer 9 to the pointed head and diffused by the colored layer 10 on its way.

According to the fourth embodiment stated above, since the curved light collecting surface 21a of the pointer 9 collects or condenses the light 22 coming from the light emitting diode 20, the light is effectively prevented from leaking from the reflecting surface 21 so that the light transmission efficiency of the device may be further improved. Moreover, since the step portion 21d of the light collecting portion 21 of the pointer 9 is arranged to abut the upper end of the rotating shaft 6, an accurate right angle of the pointer 9 to the rotating shaft 6 is assured without increasing the portion of the light collecting portion 21 interfering with the rotating shaft 6.

Since the outside base portion 20a of the light emitting diode 20 is arranged to have approximately the same diameter as the inside diameter of the bearing 18 (inside diameter of the opening 18b), the light emitting diode 20 may be positioned by the bearing 18. In other words, the bearing 18 is used as a guide to position the light emitting diode 20 so that interference of the light emitting diode 20 with the rotating shaft 6 may be eliminated and additional work to align the optical axis of the light emitting diode 20 with the light collecting surface 21a may be avoided.

Figure 5:
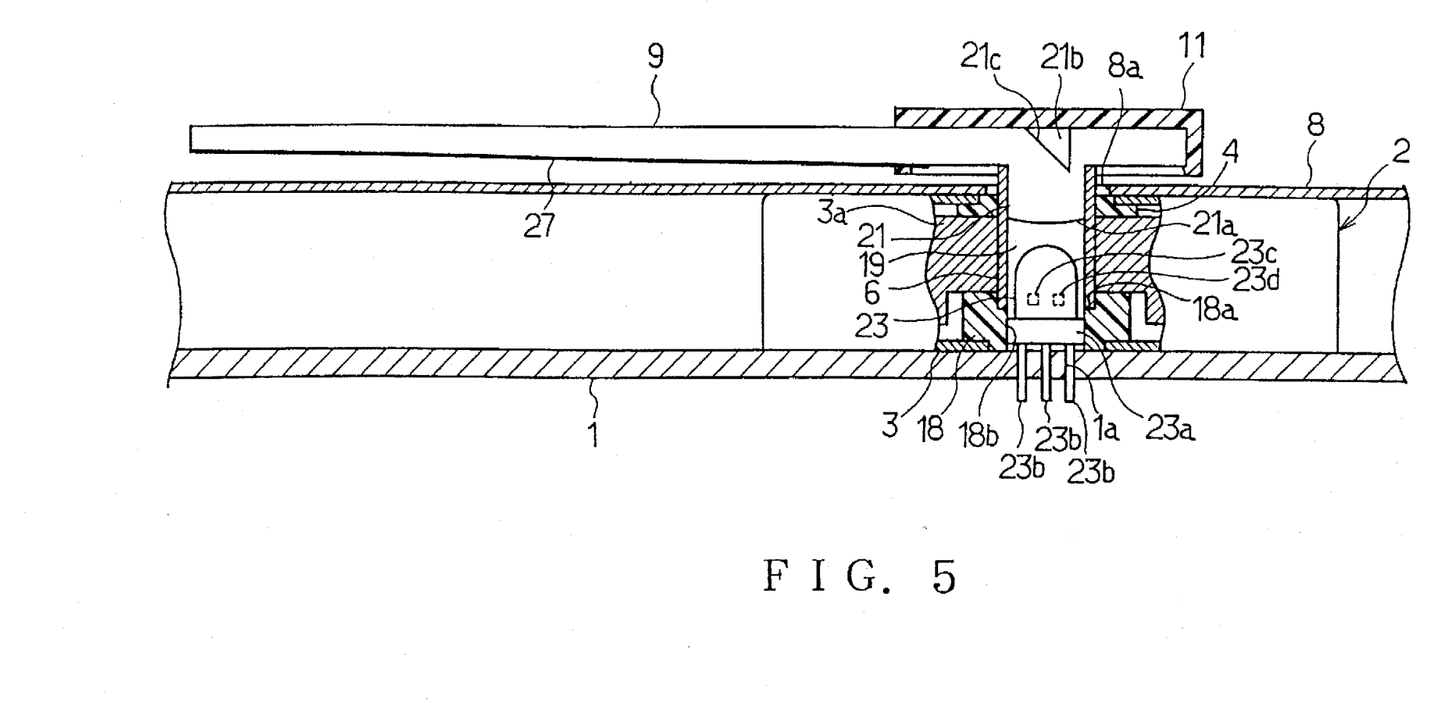
FIG. 5 is a longitudinal cross-section of a fifth embodiment according to the present invention.
Figure 6:
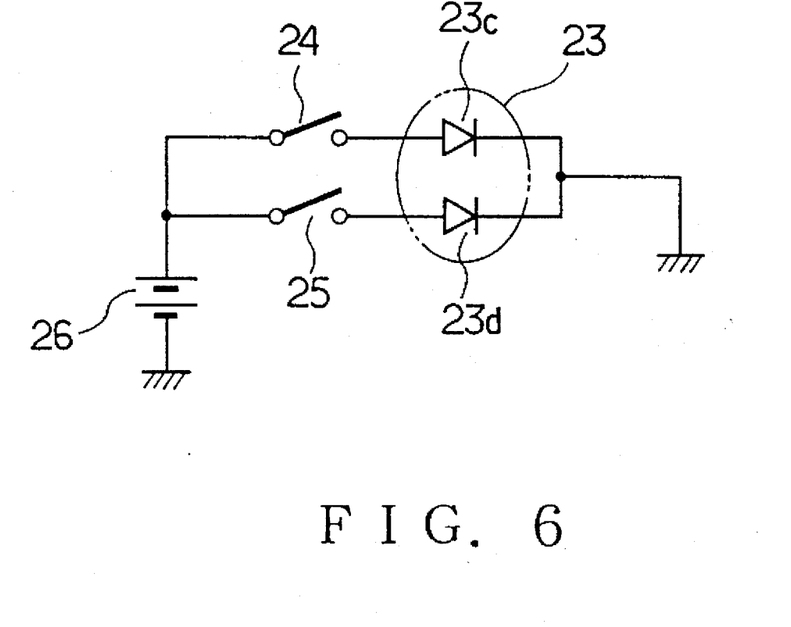
FIG. 6 is an electric circuit diagram of the fifth embodiment according to the present invention.

FIGS. 5 and 6 illustrate a fifth embodiment of the present invention, in which the same reference numerals are put on portions similar to corresponding portions shown in FIG. 4, and an explanation will be made with regard to different portions.

A light emitting diode 23 used as the light source, as shown in FIG. 5, includes a base portion 23a which has the same structure and functions in the same manner as the base portion 20a of the light emitting diode 20, and three pin terminals 23b which extend from the base portion 23a and are inserted into three through holes 1a of the printed circuit board 1. The light emitting diode 23 includes therein two chips emitting differently-colored lights, such as a chip 23c which emits green light and another chip 23d which emits red light.

The chips 23c and 23d have their cathodes jointly grounded and their anodes connected through respective switches 24 and 25, as shown in FIG. 6, to the positive terminal of a battery 26, the negative terminal of which is grounded. In this case, the switch 24 is closed when the reading of the pointer is under a given value, e.g. 100 Km/h, and the switch 25 is closed when the reading of the pointer is equal to or over 100 Km/h. A reflective layer 27 covers the back surface of the pointer 9, instead of the colored layer 10 in the preceding embodiments.

When a speed signal is applied to the internal driving unit 2, the rotating shaft 6 turns by an angle corresponding to the speed signal and, consequently, the pointer 9 turns along with the rotating shaft 6 to indicate the speed. When the reading of the pointer is under 100 Km/h, the switch 24 is closed and the chip 23c for the light emitting diode 23 is energized to emit a green light. The light emitted by the chip 23c is received by the light collecting surface 21a of the pointer 9, reflected by the light reflecting surface 21c, guided toward the pointer head and diffused by the reflective layer 27 on its way, so that the pointer is illuminated with green light emitted by the chip 23c.

When reading of the pointer exceeds 100 Km/h, the switch 25 is turned on to energize the chip 23d of the light emitting diode 23, and red light is emitted. As a result, the pointer 9 is illuminated with red light emitted by the chip 23d.

According to the fifth embodiment, the same effect as the fourth embodiment may be attained and, in addition, the illumination color may be changed according to the reading of the pointer 9. Since the pointer is illuminated with green light when the reading is under a threshold value of 100 Km/h and illuminated with red light when the reading equals or exceeds 100 Km/h, the pointer may be used as a warning signal.

The present invention is not limited to the embodiments described above and illustrated in the drawings. Of course, the present invention is applicable to a wide variety of indicating instruments in addition to the vehicle speedometer such as an indicating instrument in which a pointer is illuminated by a light source and its variations made within the spirit and the scope of the invention.

INDUSTRIAL APPLICABILITY

An indicating instrument according to the present invention is useful as the speedometer for a vehicle, and the structure having a light source emitting different colored lights is especially useful as the indicating instrument for a vehicle.

What is claimed is:

1. An indicating instrument comprising:

an internal driving unit including a stationary base member and a bearing, said bearing being secured to said base member;

a rotating shaft having one end carried by said bearing and rotated by said internal driving unit;

a pointer having a high conductivity of light and being connected to the other end of said rotating shaft; and a light source for illuminating said pointer, wherein said bearing has an accommodation space formed at the center thereof and extending from said base member to at least said one end of said rotating shaft so that said light source is disposed in said accommodation space and secured to said base member.

2. An indicating instrument according to claim 1, wherein said pointer has a light collecting portion having a light collecting surface which faces said light source and a reflecting surface coupled to said light collecting surface, said light collecting portion being formed at a foot portion thereof approximately perpendicular to said foot portion, said light collecting surface being formed in a curved shape to condense the light onto said reflecting surface.

3. An indicating instrument according to claim 1, wherein said rotating shaft comprises a cylindrical member, said pointer has a light collecting portion having a light collecting surface which faces said light source and a reflecting surface coupled to said light collecting surface, said light collecting portion being formed at a foot portion thereof approximately perpendicular to said foot portion, and the outside diameter of said light collecting portion being approximately equal to the inside diameter of said cylindrical member so as to be press-fitted into said cylindrical member.

4. An indicating instrument according to claim 3, wherein said light collecting portion of said pointer has a step portion in abutment with said other end of said rotating shaft.

5. An indicating instrument according to claim 1, wherein said light source has a part whose outside diameter is approximately equal to inside diameter of said bearing such that said light source is positioned by said bearing.

6. An indicating instrument comprising:

a stationary base member;

a stepping motor having a hollow bearing secured to base member;

a cylindrical rotating shaft carried on said bearing to be rotated by said stepping motor;

a light conductive pointer disposed to rotate along with said rotating shaft at one end of said rotating shaft; and a light source disposed inside rotating shaft at the other end thereof and secured to said base member.

* * * * *